UNITED STATES PATENT OFFICE.

JOHN A. JUST, OF SYRACUSE, NEW YORK, ASSIGNOR OF ONE-HALF TO D. H. BURRELL & COMPANY, OF LITTLE FALLS, NEW YORK, A FIRM.

BAKING-POWDER.

SPECIFICATION forming part of Reissued Letters Patent No. 11,981, dated April 29, 1902.

Original No. 692,452, dated February 4, 1902. Application for reissue filed April 5, 1902. Serial No. 101,597.

*To all whom it may concern:*

Be it known that I, JOHN A. JUST, a citizen of the United States, and a resident of Syracuse, in the county of Onondaga and State of New York, have invented a new and useful Improvement in Baking-Powders, of which the following is a specification.

The object of this invention is to utilize phosphoric acid as an acid ingredient in baking-powders. I have found that this acid can be satisfactorily employed for this purpose by combining it with casein in such proportion that a product is formed which is stable and non-hygroscopic and which is so acid in its action that it liberates a large percentage of gas from a gas-producing salt, such as bicarbonate of soda.

In practicing my invention I proceed as follows: The phosphoric acid which is employed may be produced in any well-known manner—for instance, by decomposing tricalcic or monocalcic phosphate by sulfuric acid, or, it may be, commercial phosphoric acid. The casein is produced in any suitable manner—for instance, by precipitating the curd from skim-milk by a suitable acid, separating the curd from the whey, and washing out the impurities. A caseinate, such as a compound of casein and an alkali or alkaline earth, may also be employed. I incorporate sufficient phosphoric acid with casein or a caseinate to insure sufficient acidity in the final compound. A satisfactory proportion is from twenty-three to twenty-five parts, by weight, of phosphoric acid to from seventy-seven to seventy-five parts of casein or approximately twenty-four parts, by weight, of phosphoric acid and seventy-six parts of casein or caseinate.

The preferred method of manufacturing the composition is as follows: I form an aqueous solution of phosphoric acid and introduce into the solution casein or caseinate to the amount of from twenty-five to fifty per cent., by weight, of the phosphoric acid contained in the solution. The mixture is heated until the curdy condition of the casein disappears and the mixture assumes a uniform fluid condition. It is then concentrated to a syrupy consistency. The remainder of the necessary amount of casein or caseinate is then added, and the ingredients are thoroughly mixed and united, preferably by grinding the mixture to a uniform moist mush-like consistency. The composition is then dried in a current of hot air or by other suitable means in such a way that the product is not discolored or injured and is ground to a fine powder. The intimate union of the phosphoric acid and casein during the gradual concentration of the mixture and during the grinding and drying thereof removes the changeable and hygroscopic qualities of the phosphoric acid and produces a dry and stable compound. The latter contains a much larger proportion of phosphoric acid than would be contained in acid phosphate of casein. This compound, which may be designated as a "hyperphosphate of casein," yields with its equivalent of bicarbonate of soda about fifteen per cent. of gas and forms a very desirable acid ingredient for baking-powder. When mixed with water, this compound swells up and dissolves slowly.

The following is an illustration of a satisfactory baking-powder mixture containing this improved acid ingredient: One hundred and ninety-six parts, by weight, of phosphoric acid are combined with six hundred and twenty parts of casein. The product is dried and ground. This acid compound is then mixed with three hundred and thirty-six parts of sodium bicarbonate, forming a mixture which yields about fifteen per cent. of gas. An inert filler, such as starch, is added for producing a baking-powder of the usual commercial strength. The foregoing proportions are given as an illustration and may be varied as circumstances may require—for instance, the percentage of phosphoric acid may be increased.

The residues produced by a baking-powder of this composition are entirely unobjectionable.

I do not wish to claim in this application the herein-described method of making the compound of casein and phosphoric acid, because this method is claimed in Letters Patent No. 692,454, dated February 4, 1902, granted upon an application for patent filed by me on the 30th day of September, 1901, Serial No. 77,137, as a subdivision of the original application for this patent.

I claim as my invention—

1. The herein-described highly-acid composition of matter consisting of phosphoric acid and casein, containing phosphoric acid largely in excess of the amount which is contained in acid phosphate of casein and being dry, non-hygroscopic and soluble in water.

2. The herein-described composition of matter consisting approximately of twenty-four parts, by weight, of phosphoric acid and seventy-six parts of casein.

3. A baking-powder composed of a carbonate, a filler and the herein-described composition of casein and phosphoric acid, containing phosphoric acid largely in excess of the amount which is contained in acid phosphate of casein and being dry, non-hygroscopic and soluble in water.

4. A baking-powder composed of a carbonate, a filler and the herein-described composition of casein and phosphoric acid, composed approximately of twenty-four parts, by weight, of phosphoric acid and seventy-six parts of casein.

Witness my hand this 26th day of March, 1902.

JOHN A. JUST.

Witnesses:
GEO. V. CAHILL,
D. H. STRACHAN.